US010235358B2

(12) United States Patent
Tur et al.

(10) Patent No.: US 10,235,358 B2
(45) Date of Patent: Mar. 19, 2019

(54) EXPLOITING STRUCTURED CONTENT FOR UNSUPERVISED NATURAL LANGUAGE SEMANTIC PARSING

(71) Applicant: Microsoft Technology Licensing, LLC, Redmond, WA (US)

(72) Inventors: Gokhan Tur, Los Altos, CA (US); Dilek Hakkani-Tur, Los Altos, CA (US); Larry Heck, Los Altos, CA (US); Minwoo Jeong, Bellevue, WA (US); Ye-Yi Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 13/773,269

(22) Filed: Feb. 21, 2013

(65) Prior Publication Data
US 2014/0236575 A1    Aug. 21, 2014

(51) Int. Cl.
*G06F 17/28*    (2006.01)
*G06F 17/27*    (2006.01)

(52) U.S. Cl.
CPC ................................ *G06F 17/2785* (2013.01)

(58) Field of Classification Search
CPC ............................. G06F 17/28; G06F 17/2785
USPC ............................................................. 704/9
See application file for complete search history.

(56) References Cited

U.S. PATENT DOCUMENTS

| 5,299,125 A * | 3/1994 | Baker ................... G09B 21/00 434/112 |
| 6,246,981 B1 * | 6/2001 | Papineni ................ G10L 15/22 704/235 |
| 6,311,150 B1 | 10/2001 | Ramaswamy et al. |
| 6,327,589 B1 * | 12/2001 | Blewett ............ G06F 17/30864 |
| 6,442,524 B1 | 8/2002 | Ecker et al. |
| 6,684,183 B1 | 1/2004 | Korall et al. |

(Continued)

OTHER PUBLICATIONS

Bangalore, et al., "Introduction to the Special Issue on Spoken Language Understanding in Conversational Systems", In Journal of Speech Communication, vol. 48, Issue 3, Feb. 1, 2013, 6 pages.

(Continued)

*Primary Examiner* — Edwin S Leland, III

(57) ABSTRACT

Structured web pages are accessed and parsed to obtain implicit annotation for natural language understanding tasks. Search queries that hit these structured web pages are automatically mined for information that is used to semantically annotate the queries. The automatically annotated queries may be used for automatically building statistical unsupervised slot filling models without using a semantic annotation guideline. For example, tags that are located on a structured web page that are associated with the search query may be used to annotate the query. The mined search queries may be filtered to create a set of queries that is in a form of a natural language query and/or remove queries that are difficult to parse. A natural language model may be trained using the resulting mined queries. Some queries may be set aside for testing and the model may be adapted using in-domain sentences that are not annotated. The models may be tested using these implicitly annotated natural-language-like queries in an unsupervised fashion.

19 Claims, 9 Drawing Sheets

(56) References Cited

U.S. PATENT DOCUMENTS

| | | | | |
|---|---|---|---|---|
| 6,957,213 | B1* | 10/2005 | Yuret | G06F 17/30976 704/9 |
| 7,016,829 | B2* | 3/2006 | Brill | G06F 17/274 704/231 |
| 7,031,908 | B1 | 4/2006 | Huang et al. | |
| 7,177,798 | B2 | 2/2007 | Hsu et al. | |
| 7,328,216 | B2* | 2/2008 | Hofmann | G06F 17/30699 |
| 7,379,596 | B2 | 5/2008 | Haluptzok et al. | |
| 7,418,387 | B2 | 8/2008 | Mowatt et al. | |
| 7,599,952 | B2* | 10/2009 | Parkinson | G06F 17/2715 |
| 7,647,351 | B2* | 1/2010 | Monsarrat | G06Q 30/0217 715/205 |
| 7,747,438 | B2* | 6/2010 | Nguyen | G10L 15/22 704/231 |
| 7,890,326 | B2 | 2/2011 | Strope et al. | |
| 7,912,702 | B2* | 3/2011 | Bennett | G06F 17/27 704/243 |
| 7,930,302 | B2* | 4/2011 | Bandaru | G06F 17/30864 707/737 |
| 8,024,190 | B2* | 9/2011 | Hakkani-Tur | G10L 15/065 704/252 |
| 8,135,578 | B2 | 3/2012 | Hebert | |
| 8,341,112 | B2* | 12/2012 | Zhang | G06F 17/30265 707/602 |
| 8,352,246 | B1 | 1/2013 | Lloyd | |
| 8,571,850 | B2 | 10/2013 | Li | |
| 8,645,289 | B2* | 2/2014 | Bennett | G06F 17/30675 706/12 |
| 8,694,305 | B1 | 4/2014 | Grove et al. | |
| 8,812,495 | B1 | 8/2014 | Pragada | |
| 8,930,180 | B1 | 1/2015 | Murray et al. | |
| 8,959,083 | B1* | 2/2015 | Gyongyi | G06Q 10/00 705/319 |
| 9,135,277 | B2* | 9/2015 | Petrou | G06F 17/30277 |
| 9,338,215 | B2* | 5/2016 | Shriber | G06F 17/30867 |
| 9,659,259 | B2* | 5/2017 | Li | G06F 17/30864 |
| 9,684,683 | B2* | 6/2017 | Dang | G06F 17/2785 |
| 9,747,390 | B2* | 8/2017 | Cooper | G06F 17/30672 |
| 9,904,669 | B2* | 2/2018 | Gunaratna | G06F 17/271 |
| 2003/0212544 | A1 | 11/2003 | Acero et al. | |
| 2003/0233350 | A1* | 12/2003 | Dedhia | G06F 17/30705 |
| 2004/0148170 | A1* | 7/2004 | Acero | G06F 17/2715 704/257 |
| 2004/0158455 | A1* | 8/2004 | Spivack | G06F 17/30731 704/9 |
| 2005/0108630 | A1 | 5/2005 | Wasson et al. | |
| 2005/0289124 | A1 | 12/2005 | Kaiser | |
| 2006/0031202 | A1 | 2/2006 | Chang et al. | |
| 2006/0190253 | A1 | 8/2006 | Hakkani-Tur et al. | |
| 2007/0022109 | A1* | 1/2007 | Imielinski | G06F 17/30401 |
| 2007/0033025 | A1* | 2/2007 | Helbing | G10L 15/08 704/231 |
| 2007/0198499 | A1* | 8/2007 | Ritchford | G06F 17/30864 |
| 2008/0133508 | A1* | 6/2008 | Jiang | G06F 17/3069 |
| 2008/0140384 | A1 | 6/2008 | Landau | |
| 2008/0221987 | A1* | 9/2008 | Sundaresan | G06Q 30/02 705/14.54 |
| 2008/0288347 | A1* | 11/2008 | Sifry | G06Q 30/02 705/14.41 |
| 2009/0012842 | A1 | 1/2009 | Srinivasan | |
| 2009/0077124 | A1* | 3/2009 | Spivack | G06Q 30/02 |
| 2009/0144609 | A1* | 6/2009 | Liang | G06F 17/21 715/230 |
| 2009/0248626 | A1* | 10/2009 | Miller | G06F 17/3087 |
| 2010/0023331 | A1* | 1/2010 | Duta | G10L 15/063 704/257 |
| 2011/0004462 | A1 | 1/2011 | Houghton et al. | |
| 2011/0119050 | A1 | 5/2011 | Deschact et al. | |
| 2011/0184893 | A1* | 7/2011 | Paparizos | G06F 17/30525 706/12 |
| 2011/0302179 | A1* | 12/2011 | Agrawal | G06F 17/30616 707/754 |
| 2011/0307435 | A1 | 12/2011 | Overell et al. | |
| 2011/0313769 | A1* | 12/2011 | Gorin | G10L 15/08 704/254 |
| 2012/0166183 | A1* | 6/2012 | Suendermann | G06F 17/289 704/9 |
| 2012/0191745 | A1* | 7/2012 | Velipasaoglu | G06F 17/3064 707/767 |
| 2012/0254143 | A1* | 10/2012 | Varma | G06F 17/2785 707/706 |
| 2012/0284259 | A1* | 11/2012 | Jehuda | G06F 17/30734 707/722 |
| 2012/0290293 | A1* | 11/2012 | Hakkani-Tur | G06F 17/30672 704/9 |
| 2012/0303396 | A1 | 11/2012 | Winkler et al. | |
| 2012/0323557 | A1 | 12/2012 | Koll et al. | |
| 2013/0035961 | A1 | 2/2013 | Yegnanarayanan | |
| 2013/0080152 | A1* | 3/2013 | Brun | G06F 17/30666 704/9 |
| 2013/0080162 | A1* | 3/2013 | Chang | G10L 15/34 704/235 |
| 2013/0166303 | A1* | 6/2013 | Chang | G06F 17/30787 704/258 |
| 2013/0262107 | A1* | 10/2013 | Bernard | G06F 17/2785 704/235 |
| 2014/0046934 | A1* | 2/2014 | Zhou | G06F 17/30864 707/723 |
| 2014/0067370 | A1 | 3/2014 | Brun | |
| 2014/0067375 | A1 | 3/2014 | Wooters | |
| 2014/0115001 | A1* | 4/2014 | Arroyo | G06F 17/30967 707/772 |
| 2014/0222422 | A1 | 8/2014 | Sarikaya et al. | |
| 2014/0236570 | A1* | 8/2014 | Heck | G06F 17/2785 704/9 |
| 2014/0236575 | A1* | 8/2014 | Tur | G06F 17/2785 704/9 |
| 2014/0258286 | A1* | 9/2014 | Brown | G06F 17/30654 707/728 |
| 2014/0280114 | A1 | 9/2014 | Keysar | |
| 2014/0280232 | A1* | 9/2014 | Chidlovskii | G06F 17/30038 707/749 |
| 2014/0379323 | A1 | 12/2014 | Anastasakos et al. | |
| 2014/0379326 | A1 | 12/2014 | Sarikaya et al. | |
| 2015/0178273 | A1 | 6/2015 | Hakkani-Tur et al. | |
| 2015/0227845 | A1 | 8/2015 | Hakkani-Tur et al. | |
| 2016/0350280 | A1 | 12/2016 | Lavallee et al. | |
| 2017/0199866 | A1* | 7/2017 | Gunaratna | G06F 17/271 |
| 2017/0212886 | A1 | 7/2017 | Sarikaya et al. | |
| 2017/0308583 | A1* | 10/2017 | Husain | G06F 17/30528 |

OTHER PUBLICATIONS

Bechet, et al., "Unsupervised Knowledge Acquisition for Extracting Named Entities From Speech", In IEEE International Conference on Acoustics Speech and Signal Processing, Mar. 14, 2010, 4 pages.

Broder, Andrei, "A Taxonomy of Web Search", In Newsletter of ACM SIGIR Forum, vol. 36, Issue 2, Sep. 2002, 8 pages.

Celikyilmaz, et al., "Leveraging Web Query Logs to Learn User Intent via Bayesian Latent Variable Model", In Proceedings of the 28th International Conference on Machine Learning, Jun. 28, 2011, 6 pages.

Das, et al., "Unsupervised Part-of-Speech Tagging with Bilingual Graph-Based Projections", In Proceedings of the 49th Annual Meeting of the Association for Computational Linguistics: Human Language Technologies, vol. 1, Jun. 2011, 10 pages.

Dinarelli, Marco, "Spoken Language Understanding: From Spoken Utterances to Semantic structures", In Proceedings of in Ph.D. Dissertation of DISI, University of Trento, Feb. 1, 2013, 148 pages.

Dowding, et al., "Gemini: A Natural Language System for Spoken Language Understanding", In Proceedings of the Workshop on Human Language Technology, Mar. 21, 1993, 8 pages.

Favre, et al., "Icsiboost", Retrieved on: Jul. 31, 2013, Available at: https:code.google.com/p/icsiboost/.

Freund, Yoav, "A Decision-Theoretic Generalization of On-Line Learning and an Application to Boosting", In Proceedings of in Journal of Computer and System Sciences, 55, Aug. 1997, 21 pages.

Gorin, et al., "How May I Help You?", In Journal of Speech

(56) References Cited

OTHER PUBLICATIONS

Communication—Special Issue on Interactive Voice Technology for Telecommunication Applications, vol. 23, Issue 1-2, Oct. 1997, 15 pages.
Hassan, et al., "Unsupervised Information Extraction Approach Using Graph Mutual Reinforcement", In Proceedings of the Conference on Empirical Methods in Natural Language Processing, Jul. 2006, 8 pages.
Heck, et al., "Exploiting the Semantic Web for Unsupervised Spoken Language Understanding", In IEEE Workshop on Spoken Language Technology, Dec. 2, 2012, 6 pages.
Heck, et al., "Leveraging Knowledge Graphs for Web-Scale Unsupervised Semantic Parsing", In Proceedings of INTERSPEECH, Retrieved on: Jul. 30, 2013, 5 pages.
Lane, Ian, et al., "Out-of-Domain Utterance Detection Using Classification Confidences of Multiple Topics", In Journal of IEEE Transactions on Audio, Speech, and Language Processing archive, vol. 15 Issue 1, Jan. 2007, 13 pages.
Icsiboost, Retrieved on: Feb. 6, 2013, Available at: http://code.google.com/icsiboost.
Johansson, et al., "Extended Constituent-to-Dependency Conversion for English", In Proceedings of the 16th Nordic Conference of Computational Linguistics, May 25, 2007, 8 pages.
Krishnamurthy, et al., "Weakly Supervised Training of Semantic Parsers", In Proceedings of the Joint Conference on Empirical Methods in Natural Language Processing and Computational Natural Language Learning, Jul. 12, 2012, 12 pages.
Lin, et al., "Active Objects: Actions for Entity-Centric Search", In Proceedings of the 21st International Conference on World Wide Web, Apr. 16, 2012, 10 pages.
Martin, et al., "The Det Curve in Assessment of Detection Task Performance", In Proceedings of the Eurospeech, Rhodes, Greece, Sep. 1997, 4 pages.
De Mori, et al., "Spoken Language Understanding" In Proceedings of IEEE, Signal Processing Magazine, May 2008, 9 pages.
Petrov, Slav, "Learning and inference for hierarchically split PCFGs", In Proceedings of the 22nd national conference on Artificial intelligence, vol. 2, Jul. 22, 2007, 4 pages.
Steedman, Mark, "Surface Structure and Interpretation", In Proceedings of Computational Linguistics, vol. 24, Issue 1, Apr. 4, 1996, 3 pages.
Tur, et al., "Exploiting the Semantic Web for Unsupervised Natural Language Semantic Parsing", In Proceedings of the 13th Annual Conference of the International Speech Communication Association, Sep. 9, 2012, 4 pages.
Wang, et al., "Combining Statistical and Knowledge-based Spoken Language Understanding in Conditional Models", In Proceedings of the COLING/ACL on Main Conference Poster Sessions, Jul. 2006, 8 pages.
Yarowsky, David, "Unsupervised Word Sense Disambiguation Rivaling Supervised Methods", In Proceedings of the 33rd Annual Meeting on Association for Computational Linguistics, Jun. 26, 1995, 8 pages.
Yeh, et al., "Stochastic Discourse Modeling in Spoken Dialogue Systems Using Semantic Dependency Graphs", In Proceedings of the COLING/ACL Main Conference Poster Sessions, Jul. 2006, 8 pages.
Zettlemoyer, et al., "Online Learning of Relaxed CCG Grammars for Parsing to Logical Form", In Proceedings of the Joint Conference on Empirical Methods in Natural Language Processing and Computational Natural Language Learning, Jun. 2007, 10 pages.
Hakkani-Tur, et al., "Mining Search Query Logs for Spoken Language Understanding", In Proceedings of Workshop on Future Directions and Needs in the Spoken Dialog Community: Tools and Data, Jun. 7, 2012, 4 pages.
Ge, Ruifang, "Learning Semantic Parsers Using Statistical Syntactic Parsing Techniques", In Proceedings of Artificial Intelligence Lab, Feb. 2006, 41 pages.
Poon, et al., "Unsupervised Semantic Parsing", In Proceedings of the Conference on Empirical Methods in Natural Language Processing, vol. 1, Aug. 6, 2009, 10 pages.
Goldwasser, et al., "Confidence Driven Unsupervised Semantic Parsing", In Proceedings of 49th Annual Meeting of the Association for Computational Linguistics: Human Language Technologies, vol. 1, Jun. 19, 2011, 10 pages.
Popescu, et al.,"Modern Natural Language Interfaces to Databases: Composing Statistical Parsing with Semantic Tractability", In Proceedings of 20th International Conference on Computational Linguistics, Aug. 23, 2004.
Price, P. J., "Evaluation of Spoken Language Systems: The ATIS Domain", In Proceedings of the Workshop on Speech and Natural Language, Jun. 24, 1990, 5 pages.
Pieraccini, et al., "A Speech Understanding System Based on Statistical Representation of Semantics", In Proceedings of IEEE International Conference on Acoustics, Speech and Signal Processing, Mar. 23, 1992, 4 pages.
Kuhn et al., "The Application of Semantic Classification Trees to Natural Language Understanding", In Proceedings of IEEE Transactions on Pattern Analysis and Machine Intelligence, vol. 17, Issue 5, May 1995, 12 pages.
Wang, et al., "Discriminative Models for Spoken Language Understanding", In Proceedings of International Conference on Spoken Language Processing, Sep. 17, 2006, 4 pages.
Raymond, et al., "Generative and Discriminative Algorithms for Spoken Language Understanding", In Proceedings of the Interspeech, Aug. 27, 2007, 4 pages.
Seneff, Stephanie, "TINA: A Natural Language System for Spoken Language Applications", In Proceedings of Computational Linguistics, vol. 18, Issue 1, Mar. 1992, 26 pages.
Ward, et al., "Recent Improvements in the CMU Spoken Language Understanding System", In Proceedings of the Workshop on Human Language Technology, Mar. 8, 1994, 4 pages.
Li, et al., "Extracting Structured Information from User Queries with Semi-Supervised Conditional Random Fields", In Proceedings of the 32nd International ACM SIGIR Conference on Research and Development in Information Retrieval, Jul. 19, 2007, 8 pages.
Wang, et al., "Semi-Supervised Learning of Semantic Classes for Query Understanding: From the Web and for the Web", In Proceedings of the 18th ACM Conference on Information and Knowledge Management, Nov. 2, 2009, 10 pages.
Liu, et al., "Lexicon Modeling for Query Understanding", In Proceedings of the IEEE International Conference on Acoustics, Speech, and Signal Processing, May 22, 2011, 4 pages.
Tur, et al., "Towards Unsupervised Spoken Language Understanding: Exploiting Query Click Logs for Slot Filling", In Proceedings of the Interspeech, Aug. 28, 2011, 4 pages.
Lafferty, et al., "Conditional Random Fields: Probabilistic Models for Segmenting and Labeling Sequence Data", In Proceedings of the Eighteenth International Conference on Machine Learning, Jun. 28, 2001, 8 pages.
Lowe, et al., "A Frame-Semantic Approach to Semantic Annotation", In Proceedings of ACL SIGLEX Workshop on Tagging Text with Lexical Semantics, Apr. 1997, 7 pages.
McIlraith, et al., "Semantic Web Services", In Proceedings of IEEE Intelligent Systems, vol. 16, Issue 2, Mar. 2001, 8 pages.
Shadbolt, et al., "The Semantic Web Revisited", In Proceedings of IEEE Intelligent Systems, vol. 21, No. 3, May 2006, 6 pages.
Guha, et al., "Semantic Search", In Proceedings of Twelfth International World Wide Web Conference, May 20, 2003, 10 pages.
Lenat, Douglas B., "CYC: A Large-Scale Investment in Knowledge Infrastructure", In Communications of the ACM, vol. 38, Issue 11, Nov. 1995, 7 pages.
Hakkani-Tur, et al., "Unsupervised and Active Learning in Automatic Speech Recognition for Call Classification", In IEEE International Conference on Acoustics, Speech and Signal Processing, May 17, 2004, 4 pages.
U.S. Appl. No. 13/169,679, Amendment and Response dated Sep. 25, 2015, 14 pgs.
U.S. Appl. No. 13/169,679, Office Action dated Oct. 20, 2015, 13 pgs.

(56) References Cited

OTHER PUBLICATIONS

U.S. Appl. No. 13/169,679, Office Action dated Dec. 17, 2014, 9 pgs.
U.S. Appl. No. 13/169,679, Amendment and Response dated Apr. 17, 2015. 12 pgs.
U.S. Appl. No. 13/169,679, Office Action dated Jun. 26, 2015, 12 pgs.
Hakkani-Tur, et al., "Exploiting Query Click Logs for Utterance Domain Detection in Spoken Language Understanding", In IEEE International Conference on Acoustics, Speech and Signal Processing, May 22, 2011, 4 pages.
Hakkani-Tur, et al., "Translating Natural Language Utterances to Search Queries for SLU Domain Detection Using Query Click Logs", In IEEE International Conference on Acoustics, Speech, and Signal Processing, Mar. 2012, 4 pages.
Hakkani-Tur, et al., "Using a Knowledge Graph and Query Click Logs for Unsupervised Learning of Relation Detection", In IEEE International Conference on Acoustics, Speech, and Signal Processing, May 26, 2013, 5 pages.
U.S. Appl. No. 13/769,679, Office Action dated May 26, 2016, 15 pgs.
U.S. Appl. No. 14/136,919, Office Action dated Jul. 11, 2016, 17 pgs.
Asuncion, et al., "On Smoothing and Inference for Topic Models," In Proceedings of the Twenty-Fifth Conference on Uncertainty in Artificial Intelligence, 2009, 8 pages.
Bangalore, et al., "Towards Learning to Converse: Structuring Task-Oriented Human-Human Dialogs," In Proceedings of the IEEE International Conference on Acoustics, Speech and Signal Processing, 2006, 4 pages.
Blei, et al., "Latent Dirichlet Allocation," In Journal of Machine Learning Research, vol. 3, 2003, 30 pages.
Broder, Andrei, "A Taxonomy of Web Search," ACM SIGIR Forum, vol. 36, Issue 2, 2002, 8 pages.
Chelba, et al., "Speech Utterance Classification," In Proceedings of the IEEE International Conference on Acoustics, Speech, and Signal Processing, 2003, 4 pages.
Cheung, et al., "Sequence Clustering and Labeling for Unsupervised Query Intent Discovery," In Proceedings of the Fifth ACM International Conference on Web Search and Data Mining, Feb. 2012, 10 pages.
Chotimongkol, et al., "Automatic Concept Identification in Goal-Oriented Conversations," Carnegie Mellon University, Computer Science Department, Paper 1397, 2002, 5 pages.
Chu-Carroll, "Vector-based Natural Language Call Routing," In Journal of Computational Linguistics, vol. 25, Issue 3, 1999, 28 pages.
Cox, Steven, "Discriminative Techniques in Call," In Proceedings of the IEEE International Conference on Acoustics, Speech, and Signal Processing, vol. 1, 2003, 4 pages.
Fan, et al., "LIBLINEAR: A Library for Large Linear Classification," In Journal of Machine Learning Research, vol. 9, 2008, 4 pages.
Gelman, et al., "Bayesian Data Analysis," available at: <<http://www.amazon.com/Bayesian-Analysis-Edition-Chapman-Statistical/dp/158488388X>>, Chapman and Hall/CRC publishers, 2nd Edition, 2003, Amazon.com product page only, accessed on Jul. 23, 2013, 6 pages.
Gu, et al., "Cross Domain Random Walk for Query Intent Pattern Mining from Search Engine Log," Proceedings of the IEEE11th International Conference on Data Mining, 2011, 10 pages.
Hafiner, "Optimizing SVMs for Complex Call Classification," In Proceedings of the IEEE International Conference on Acoustics, Speech, and Signal Processing, vol. 1, 2003, 4 pages.
Hakkani-Tur, Dilek, available at <<http://research.microsoft.com/en-us/people/dilekha/>>, Employee information page listing publications, Microsoft Research, Microsoft Corporation, Redmond, WA, accessed on Jan. 23, 2014, 15 pages.
Hakkani-Tur, et al., "A Weakly-Supervised Approach for Discovering New User Intents from Search Query Logs," In Proceedings of the Annual Conference of International Speech Communication Association, Aug. 2013, 5 pages.
Hakkani-Tur, et al., "Bootstrapping Domain Detection Using Query Click Logs for New Domains," In Proceeding of the International Speech Communication Association, 2011, 4 pages.
Higashinaka, et al., "Incorporating Discourse Features into Confidence Scoring of Intention Recognition Results in Spoken Dialogue Systems," In Proceedings of the IEEE International Conference on Acoustics, Speech, and Signal Processing, 2005, 4 pages.
Lee, et al., "Unsupervised Modeling of User Actions in a Dialog Corpus," In Proceedings of the IEEE International Conference on Acoustics, Speech and Signal Processing, Mar. 2012, 4 pages.
Lee, et al., "Unsupervised Spoken Language Understanding for a Multi-Domain Dialog System," In IEEE Transactions on Audio, Speech, and Language Processing, vol. 21, Issue 11, Nov. 2013, 14 pages.
Li, et al, "Learning Query Intent from Regularized Click Graphs," In Proceedings of 31st Annual International ACM SIGIR Conference on Research and Development in Information Retrieval, 2008, 8 pages.
Li, et al., "Unsupervised Semantic Intent Discovery from Call Log Acoustics," Proceedings of the IEEE International Conference on Acoustics, Speech and Signal Processing, 2005, 4 pages.
Mintz, et al., "Distant supervision for relation extraction without labeled data," Proceedings of the Joint Conference of the 47th Annual Meeting of the AGL and the 4th International Joint Conference on Natural Language Processing of the AFNLP, 2009, 9 pages.
Natarajan, et al., "Speech Enabled Natural Language Call Routing: BBN Call Director," In Proceedings of the International Conference on Spoken Language Processing (ICSLP), 2002, 4 pages.
Pantel, et al., "Mining Entity Types from Query Logs via User Intent Modeling," In Proceedings of the 50th Annual Meeting of the Association for Computational Linguistics, vol. 1, Jul. 2012, 9 pages.
Polifroni, et al., "Using Latent Topic Features for Named Entity Extraction in Search Queries," Proceedings of the 12th Annual Conference of the International Speech Communication Association, 2011, 4 pages.
Pound, et al., "Facet Discovery for Structured Web Search: A Query-log Mining Approach," Proceedings of the ACM SIGMOD International Conference on Management of Data, 2011, 13 pages.
Radlinski, et al., "Inferring Query Intent from Reformulations and Clicks," In Proceedings of the 19th International Conference on World Wide Web, 2010, 2 pages.
Strohmaier, et al., "Acquiring Knowledge about Human Goals from Search Query Logs," In the Proceedings of the International Journal Information Processing and Management, Jan. 2012, 38 pages.
Tur et al., "Spoken Language Understanding," 2011, John Wiley & Sons, 450 pages.
Tur, et al., "Semi-Supervised Learning for Spoken Language Understanding using Semantic Role Labeling," In IEEE Workshop on Automatic Speech Recognition and Understanding, 2005, 6 pages.
Tur, et al., "Spoken Language Understanding: Systems for Extracting Semantic Information from Speech", accessible at: <<http://www.amazon.com/Spoken-Language-Understanding-Extracting-Information/dp/0470688246>>, Wiley, 1st edition, published on Apr. 25, 2011, Amazon.com product page only, retrieved on Jan. 9, 2014, 4 pages.
Tur, et al., "Towards Unsupervised Spoken Language Understanding: Exploiting Query Click Logs for Slot Filling," In Proceeding of the 12th Annual Conference of the International Speech Communication Association, 2011, 4 pages.
U.S. Appl. No. 14/180,335, Amendment and Response filed Oct. 17, 2016, 13 pgs.
U.S. Appl. No. 14/180,335, Amendment and Response filed Jul. 5, 2016, 13 pgs.
U.S. Appl. No. 14/180,335, Office Action dated May 24, 2016, 12 pgs.
U.S. Appl. No. 14/180,335, Office Action dated Aug. 31, 2016, 14 pgs.

(56) References Cited

OTHER PUBLICATIONS

Wallach, Hanna M., "Structured Topic Models for Language," available at <<https://people.cs.umass.edu/-wallach/theses/wallach_phd_thesis.pdf>>, Ph.D. Dissertation, University of Cambridge, 2008, 136 pages.

Yi, et al., "Query Clustering using Click-Through Graph," In Proceedings of the 18th International Conference on World Wide Web, 2009, 2 pages.

Zhang, et al., "Extracting Phrase Patterns with Minimum Redundancy for Unsupervised Speaker Role Classification", In Proceeding of Human Language Technologies: The Annual Conference of the North American Chapter of the Association for Computational Linguistics, 2010, 4 pages.

U.S. Appl. No. 13/769,679, Appeal Brief filed Jan. 25, 2017, 25 pgs.

U.S. Appl. No. 14/136,919, Amendment and Response filed Nov. 14, 2016, 17 pgs. pgs.

U.S. Appl. No. 14/136,919, Office Action dated Feb. 8, 2017, 18 pgs.

U.S. Appl. No. 14/180,335, Office Action dated Dec. 1, 2016, 13 pgs.

JR Wen et al., "Clustering User Queries of a Search Engine", ACM World Wide Web Consortium 2010, 14 pgs.

Notice of Non-Compliant Amendment dated Nov. 9, 2016 from U.S. Appl. No. 13/773,269, 3 pgs.

Notice of Appeal filed Oct. 25, 2016 from U.S. Appl. No. 13/769,679, 2 pages.

U.S. Appl. No. 14/180,335, Amendment and Response filed Jan. 25, 2017, 12 pgs.

U.S. Appl. No. 14/180,335, Notice of Allowance dated Mar. 15, 2017, 5 pgs.

U.S. Appl. No. 14/180,335, Notice of Allowance dated Apr. 25, 2017, 2 pgs.

Hillard, et al., "Learning Weighted Entity Lists from Web Click Logs for Spoken Language Understanding", In Proceedings of the Interspeech, Aug. 28, 2011, 4 pages.

U.S. Appl. No. 13/769,679, Examiner's Answer to the Appeal Brief dated May 9, 2017, 11 pgs.

U.S. Appl. No. 14/136,919, Amendment and Response filed Jun. 8, 2017, 24 pgs.

Lu, et al., "A Generative Model for Parsing Natural Language to Meaning Representations", In Proceedings of the Conference on Empirical Methods in Natural Language Processing, Oct. 25, 2008, 10 pages.

PCT International Search Report and Written Opinion in International Application PCT/US2017/013584, dated May 9, 2017, 16 pgs.

U.S. Appl. No. 13/769,679, Reply Brief filed Jul. 10, 2017, 11 pages.

U.S. Appl. No. 14/136,919, Office Action dated Sep. 1, 2017, 14 pages.

U.S. Appl. No. 14/180,335, Notice of Allowance dated Sep. 20, 2017, 5 pages.

U.S. Appl. No. 14/136,919, Amendment and Response filed Jan. 2, 2018, 22 pages.

U.S. Appl. No. 14/136,919, Notice of Allowance dated May 1, 2018, 9 pages.

Ganchev, et al., "Using Search-Logs to Improve Query Tagging", In Proceedings of the 50th Annual Meeting of the Association for Computational Linguistics, Short Papers, vol. 2, Jul. 8, 2012, 5 Pages.

Hakkani-Tur, et al., "Employing Web Search Query Click Logs for Multi-Domain Spoken language Understanding", In Proceedings of Automatic Speech Recognition and Understanding (ASRU), Dec. 2011, 6 Pages.

U.S. Appl. No. 13/169,679, Amendment and Response dated Feb. 22, 2016, 14 pgs.

"Non Final Office Action Issued in U.S. Appl. No. 15/004,324", dated Oct. 1, 2018, 34 Pages.

Microsystems, Sun, "Application Packaging Developer's Guide", Apr. 2009, 190 Pages.

Srinivasan, "Managing Heterogeneous Information Systems through Discovery and Retrieval of Generic Concepts", In the Journal of the American Society for Information Science, Jun. 2000, 17 Pages.

Zhao, et al., "Combining Schema and Instance Information for Integrating Heterogeneous Data Sources", In the Proceedings of Data & Knowledge Engineering, May 1, 2007, 23 Pages.

* cited by examiner

EXPLOITING STRUCTURED CONTENT FOR UNSUPERVISED NATURAL LANGUAGE SEMANTIC PARSING

BACKGROUND

Designing and training computing machines used in natural language understanding systems typically requires a large amount of human effort. Semantic parsing is used to map natural language input into a formal representation of its meaning. Parsing natural language input and determining a grammar for conversational systems that defines the structural rules is difficult. Many systems rely on manually crafted grammars which uses a large amount of experts and is labor-intense and does not scale easily. Other systems use in-domain annotated data that is labor-intense and time-consuming.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Structured content, such as structured web pages, are accessed and parsed to obtain implicit annotation for natural language understanding tasks. Search queries that hit these structured web pages are automatically mined for information that is used to semantically annotate the queries. The automatically annotated queries may be used for automatically building statistical unsupervised slot filling models without using a semantic annotation guideline. For example, tags that are located on a structured web page that are associated with the search query may be used to annotate the query. The mined search queries may be filtered to create a set of queries that is in a form of a natural language query and/or remove queries that are difficult to parse. A natural language model may be trained using the resulting mined queries. Some queries may be set aside for testing and the model may be adapted using in-domain sentences that are not annotated. The models may be tested using these implicitly annotated natural-language-like queries in an unsupervised fashion.

DETAILED DESCRIPTION

Figure 1:
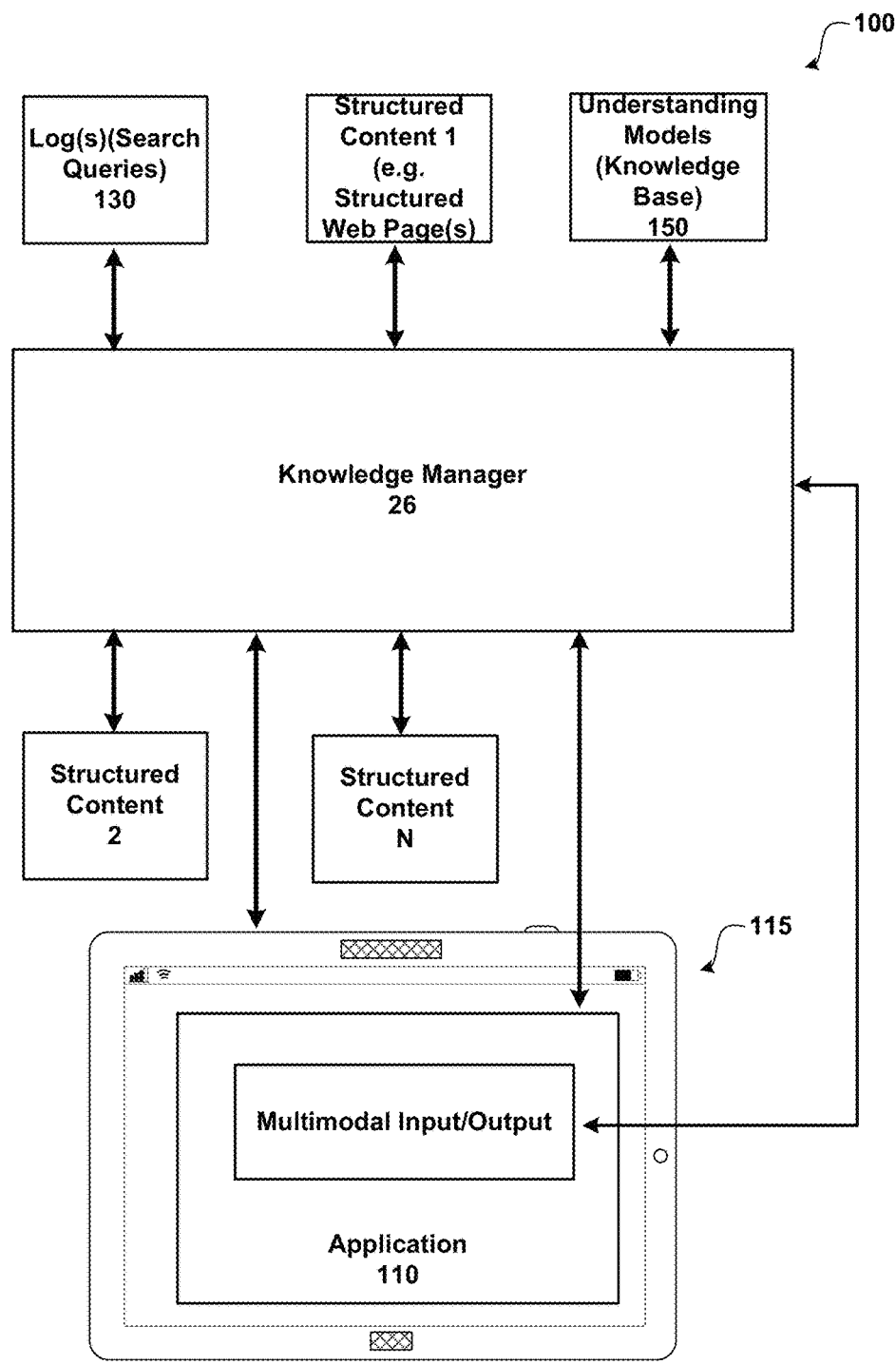
FIG. 1 shows a system for using the semantic web for unsupervised natural language semantic parsing.

Referring now to the drawings, in which like numerals represent like elements, various embodiment will be described.

FIG. 1 shows a system for using the semantic web for unsupervised natural language semantic parsing. As illustrated, system 100 includes knowledge manager 26, log(s) (search queries) 130, understanding model(s) 150, structured content 1-N, application 110 and touch screen input device/display 115.

In order to facilitate communication with the knowledge manager 26, one or more callback routines, may be implemented. According to one embodiment, application program 110 is a multimodal application that is configured to receive speech input and input from a touch-sensitive input device 115 and/or other input devices. For example, voice input, keyboard input (e.g. a physical keyboard and/or SIP), video based input, and the like. Application program 110 may also provide multimodal output (e.g. speech, graphics, vibrations, sounds, . . . ). Knowledge manager 26 may provide information to/from application 110 in response to user input (e.g. speech/gesture). For example, a user may say a phrase to identify a task to perform by application 110 (e.g. selecting a movie, buying an item, identifying a product, . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

A natural user interface (NUI) and/or some other interfaces may be used to interact with a system. For example, a combination of a natural language dialog and other non-verbal modalities of expressing intent (gestures, touch, gaze, images/videos, spoken prosody, etc.) may be used to interact with the application/service. Knowledge manager 26 may use an understanding model (e.g. a Spoken Language Understanding (SLU) model and/or multimodal understanding model such as understanding models (knowledge base) 150). Knowledge manager 26 is part of a dialog system that receives speech utterances and is configured to extract the meaning conveyed by a received utterance.

Generally, Natural Language Understanding (NLU) in goal-oriented dialog systems is directed at identifying the domain(s) and intent(s) of the user, as expressed in natural language (NL), and to extract associated arguments or slots. For example, in an airline domain, users often request flight information (e.g. "I want to fly to Boston from New York next week"). In many instances the slots are specific to the target domain and finding target values within automatically recognized spoken utterances can be challenging due to automatic speech recognition errors and poor modeling of natural language variability. Different classification methods may be used for filling frame slots from the application domain using a given training data set and performed comparative experiments. These methods generally use generative models such as hidden Markov models, discriminative classification methods and probabilistic context free grammars.

Some NLU models are trained using supervised machine learning methods. These models use a large number of in-domain sentences which are semantically annotated by humans. This can be a very expensive and time consuming process. Additionally, NLU models use in-domain gazetteers (such as city, movie, actor, or restaurant names) for better generalization. Populating and maintaining these gazetteers, which are typically very dynamic and need constant maintenance, requires a significant amount of manual labor and typically semi-automated knowledge acquisition techniques are employed. For instance, query click logs leveraging domain specific structured information for web query tagging and built semi-supervised models using the derived labels. Structured HTML lists may be used to automatically generate gazetteers. These gazetteers were then used to improve slot filling models.

Knowledge manager 26 is configured to access structured content (e.g. structured content 1-N), such as structured web pages and to automatically annotate queries that hit these web pages. The structured content that is accessed is based on a type of information to learn. For example, movie web site(s) may be accessed for information relating to a movie domain, music web site(s) may be accessed for information relating to a music domain, sport web site(s) may be accessed for information relating to a sport domain, and the like. For purposes of explanation, and not intended to be limiting, an example presented herein relates to building an unsupervised slot filling model for the movies domain with some representative slots is provided for explanatory purposes. The methods presented herein may be applied to other domains.

Knowledge manager 26 accesses and parses structured web pages to obtain implicit annotation for natural language understanding tasks. Search queries that hit these structured web pages are automatically mined by knowledge manager 26 for information that is used to semantically annotate these queries. The automatically annotated queries are then used by knowledge manager 26 for automatically building statistical unsupervised slot filling models without using a semantic annotation guideline. For example, tags that are located on a structured web page that are associated with the search query are used to annotate the query. Knowledge manager 26 may filter the mined search queries to create a refined set of queries. For example, the queries may be filtered to obtain queries that are in a form of a natural language query, remove queries that are difficult to parse, and the like. An understanding model 150 may be trained using the resulting mined queries. Some queries may be set aside for testing by knowledge manager 26 and the model may be adapted using in-domain sentences that are not annotated. The models may be tested using these implicitly annotated natural-language-like queries in an unsupervised fashion The model created using the mined queries may be adapted in an unsupervised manner when there in-domain unannotated sentences available to knowledge manager 26. Implicitly annotated natural-language-like queries may be used for testing the performance of the models in an unsupervised fashion. Unannotated training data may be mined for semantic parsing. Instead of stripping out the context words found in candidate entities, the context words may be used to train slot filling models. This is directed at eliminating the need to maintain gazetteers. This method may be combined with annotated data to improve performance.

In the method described herein, the semantic web experience is combined with statistical natural language semantic parsing. For instance, a query targeting a movie domain like "showtimes for hugo by scorsese", resulting in a click to the IMDB web page of this movie, can be parsed for both the movie name and the director, exploiting the semantic structure of the landing web page. This is also the case for many other movie-related web sites such as rottentomatoes.com or netflix.com, and also for queries belonging to other domains. For example, queries directed to the restaurant domain going to urbanspoon.com, book queries going to barnesandnoble.com, or queries in financial domain going to finance.yahoo.com. This implicit annotation provided by the semantic web assists in mining queries, building bootstrap slot filling models, and evaluating the models.

Semantic Parsing

Different methods may be used for slot filling. According to an embodiment, discriminative statistical models, such as conditional random fields (CRFs), are used for modeling. More formally, slot filling is framed as a sequence classification problem to obtain the most probable slot sequence:

$$\hat{Y} = \frac{\text{argmax}}{Y} p(Y \mid X)$$

where $X=x_1, \ldots, x_T$ is the input word sequence and $Y=y_1, \ldots, y_T$, $y_t \in C$ is the sequence of associated class labels, C.

CRFs may outperform other classification methods for sequence classification since the training can be done discriminatively over a sequence. The baseline model uses word n-gram based linear chain CRF, imposing the first order Markov constraint on the model topology. Similar to maximum entropy models, in this model, the conditional probability, $p(Y|X)$ is defined as:

$$p(Y \mid X) = \frac{1}{Z(X)} \exp\left(\sum_k \lambda_k f_k(y_{t-1}, y_t, x_t)\right)$$

with the difference that both X and Y are sequences instead of individual local decision points given a set of features $f_k$ (such as n-gram lexical features, state transition features, or others) with associated weights $\lambda_k$. $Z(X)$ is the normalization term. After the transition and emission probabilities are optimized, the most probable state sequence, $\hat{Y}$ can be determined using the Viterbi algorithm. According to an embodiment, the IOB (in-out-begin) format is used in representing the data as shown below.

Unsupervised Slot Filling Model Building and Evaluation

Some slot filling approaches rely on semantically annotated natural language data and/or semantic grammars, based on carefully designed semantic templates. While there have been a number of generic natural language understanding semantic frames, such as FRAMENET, for "targeted" or goal-oriented understanding tasks, researchers have preferred to define task-specific templates (optionally using generic frames as feedback or features). In the case of the ATIS system, the project participants contributed to the design of the semantic template, which consists of slots like departure city, arrival city, airline, date, and time. From a few thousand sentences, 79 different slots were used, which can be clustered into 44 unique categories (e.g., destination city or destination airport code can be grouped together).

When a new slot filling model is to be built for a new domain, the typical first step is to design the semantic template based on some seed sentences that defines the scope of the task. For example, if the domain to be added is movies, actor, director, movie name, genre, or release date may be used as potential slots. According to an embodiment, knowledge manager 26 does not utilize a semantic template.

Semantic Parsing of Target Web Pages

Structured web pages are located when a new domain is to be added. Many existing web pages include structured content that may be semantically parsed using simple patterns to extract key information. For example, movie web page (e.g. FREEBASE, IMDB, ROTTEN TOMATOES, . . . ) may be parsed to extract titles of movies, cast of the movie, release date, genre, run time, rating, plot summary, writers, directors, crew, and the like.

Figure 2:
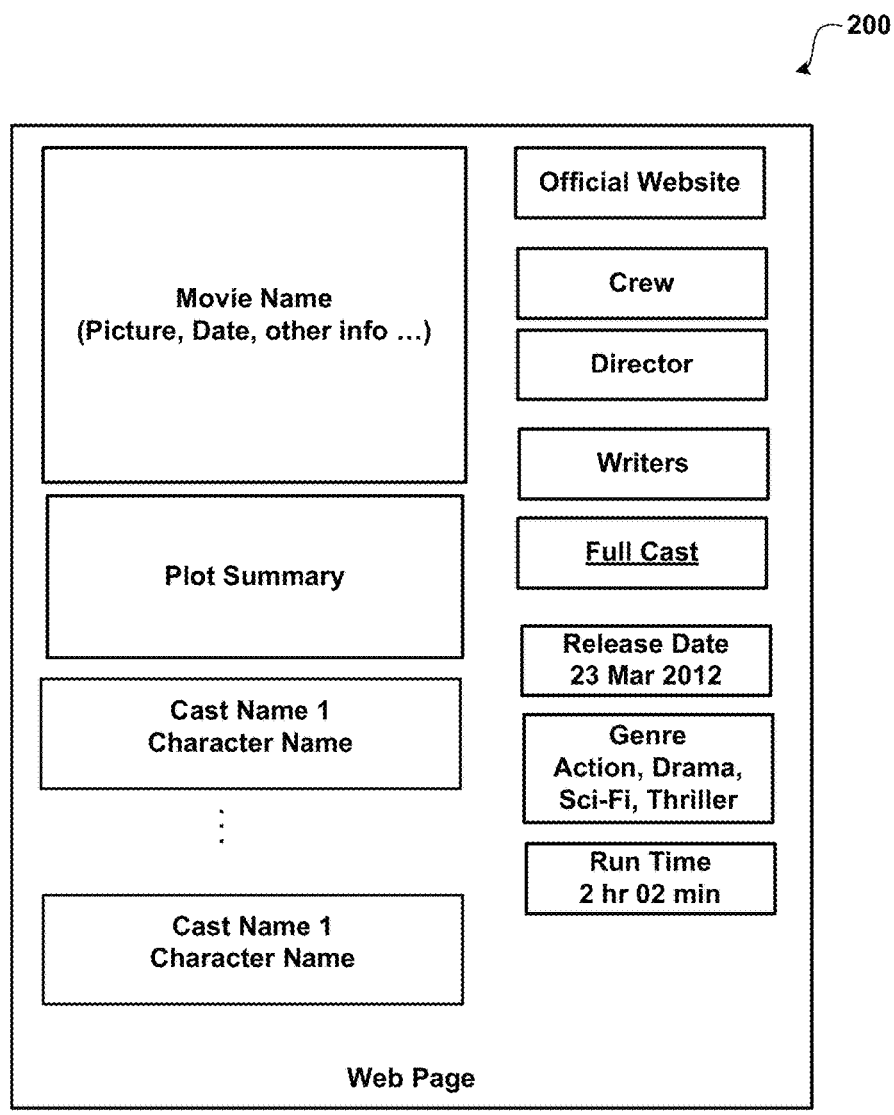
FIG. 2 illustrates an exemplary structured web page relating to a movie.

FIG. 2 illustrates an exemplary structured web page relating to a movie. One or more web pages may be associated with a movie. The information associated with a web page may change depending on the web site being accessed. For example, some web sites include different information. In the example illustrated, web page 200 includes information related to the movie name, a plot summary, cast names, crew names (e.g. director, writers), other crew (e.g. Full Cast), the release date, the genre, and run-time. Information for other domains continues to be stored in structured web pages.

Since there is no domain or task specific semantic template ready, the method described uses the structure of the semantic web. A Resource Description Framework (RDF) may be used that is a triple-based representation for the semantic web. A triple typically consists of two entities linked by some relation. An example would be directed by (Avatar, James Cameron). As RDFs have become more popular, triple stores (referred as knowledge-bases) covering various domains have emerged (e.g. freebase.org). Already defined ontologies may be extended or elements within one ontology may be used within another ontology. A commonly used ontology is provided in schema.org, with consensus from academia and major search companies like MICROSOFT and GOOGLE. While the structured content is illustrated within structured web pages, other structured content may be used.

Figure 3:
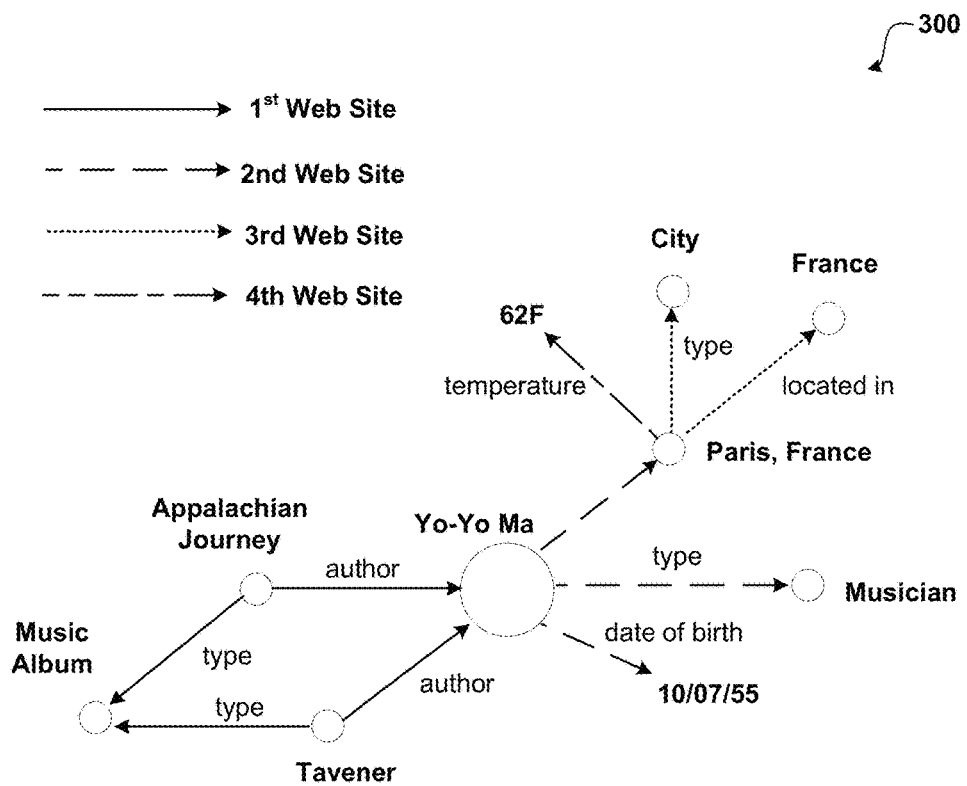
FIG. 3 shows an exemplary Resource Description Framework (RDF) segment.

An example RDF segment pertaining the artist Yo-Yo Ma is shown in FIG. 3. Viewing FIG. 3 is can be seen that Yo-Yo was born in Paris in 1955, and is an author of the music albums, Tavener and Appalachian Journey. The RDF segment illustrated in FIG. 3 includes information obtained from different web sites (e.g. web sites 1-4). These semantic ontologies are not only used by search engines, which try to semantically parse them, but also by the authors of these pages for better visibility. These kinds semantic ontologies are similar to the semantic ontologies used in goal-oriented natural dialog systems.

Mining Natural Language in-Domain Data

Search engine resources are used for semantic parsing of the web pages feeding the target domain triple store. The next step is to extract queries matching the already parsed web pages.

The queries are semantically annotated by knowledge manager 26 using the tags in the web page. For example, a query like "2012 movie the hunger games by gary ross" can be parsed using the information provided in FIG. 2. Since there may be a large numbers of queries, a series of filters is used to obtain a representative set of data to train and test the understanding models. These include the elimination of queries which cannot be parsed and which have an untagged non-stopword matching one of the entities in the web page. These may be queries with typos, such as "the hunger games by gary roos". According to an embodiment, these queries may be corrected (e.g. spelling correction). Queries are in query language that is somewhat different than natural language. It has been found that a vast majority of the mined queries generally consist of keywords or phrases as expected. Different versions of this mined data may be used. For example, tagged queries may be used, tagged queries with a stopword which is not tagged to eliminate entity-only queries (like "avatar cameron") (NL-like) may be used, and queries which are also grammatical sentences (like "who directed avatar") (grammatical) may be used.

Building and Evaluation of Models

The mined queries can then be used by knowledge manager 26 to train the understanding models. Some of these queries (e.g. based on the date of the queries and/or some other distinguisher) may be set aside for testing purposes. When there is some unannotated in-domain data, an unsupervised framework without a semantic annotation guideline may be used. For such a case, a maximum-a-posteriori (MAP) adaptation technique may be used where the bootstrapped NLU model annotates the data, which can then be used to improve the model.

One feature of the approach described herein is that the schema used to parse the web pages is the same as the schema used to parse the natural language input. This assists in alleviating the problem of interpretation, as there are no mismatches or inconsistencies, which happens frequently with task-specific semantic templates.

Experiments and Results

The following experiment and results for a target domain of movies is for explanatory purposes and is not intended to be limiting. The users present queries about various movies, such as who is the director of avatar, show me some action movies with academy awards, or when is the next harry potter gonna be released. For purposes of explanation, 4 top named slots are examined including movie, actor, director, and character names.

A control set of natural language data from this domain, consisting of about 2,700 sentences, with about 300 sentences reserved for testing is created. This control set includes about 3,750 slots (about 1,400 movie names). Compare this with the total amount of mined data, consisting of 287,216 queries (with 326,744 slots), after extensive filtering. Examining the queries, it has been found out that 48,364 of them (with 54,988 slots) are natural-language-like (NL-like), having a stopword in them which is not part of a slot, and 3,925 of them (with 4,046) are grammatical sentences.

TABLE 1

Unsupervised slot filling adaptation performance on control test set, assuming in-domain sentences.

|  | Movie Name F-Measure | Actor Name F-Measure | All Slots F-Measure |
| --- | --- | --- | --- |
| Supervised Set | 55.22% | 81.25% | 64.26% |
| Unsupervised Set | 47.42% | 83.59% | 57.82% |

TABLE 1-continued

Unsupervised slot filling adaptation performance on
control test set, assuming in-domain sentences.

|  | Movie Name F-Measure | Actor Name F-Measure | All Slots F-Measure |
|---|---|---|---|
| NL-like | 47.94% | 84.26% | 57.73% |
| NL-like + Unsupervised Set | 50.21% | 85.47% | 60.03% |

Table 1 presents results using 3 sets of queries for the query test set and the control test set. Seeing that the NL-like set results in better performance on the control set, compared to all or grammatical queries, we have used 20% of those queries for unsupervised test set. While having good coverage, the query set is more similar to sentences we would expect to receive. On the control test set, the unsupervised approach achieved x % (64.26% vs. 57.73%) of the performance obtained using a supervised model, and actually outperforming the supervised model on some slots like the actor name. While the performances are higher in the NL-like unsupervised test set, probably due to much bigger data sizes, it can be observed that using all queries resulted in slightly better performance for this set.

As another set of experiments, an unsupervised MAP adaptation is performed by automatically annotating the control train set using the model trained from NL-like queries. This is for simulating the scenario when there are some in-domain sentences but there are no semantic annotations or guidelines. This well-known technique has improved the performance of slot filling on the control test set significantly, covering 35% of the difference between the supervised and unsupervised model performances (57.73% to 60.03% F-Measure).

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Figure 4:
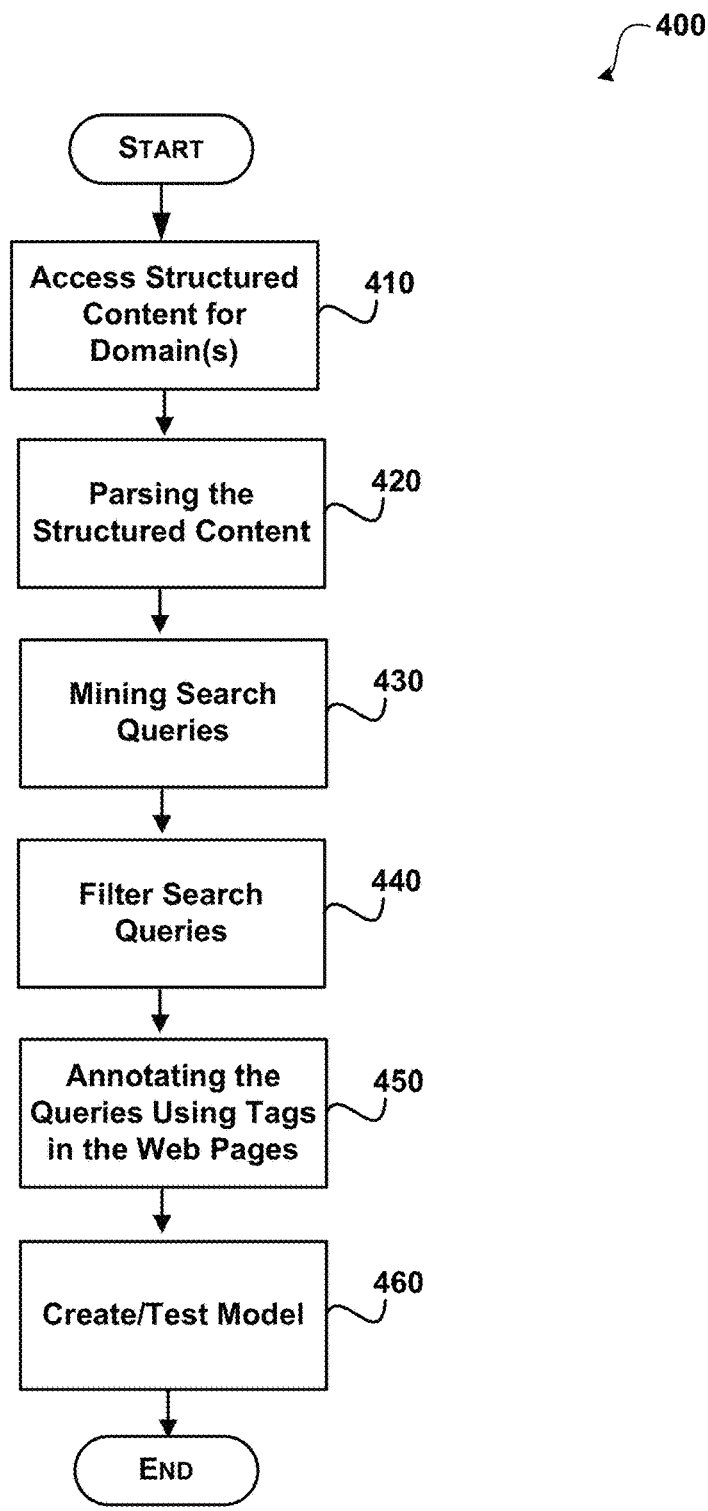
FIG. 4 shows a process for automatically mining and annotating queries.

FIG. 4 shows a process 400 for automatically mining and annotating queries.

After a start operation, the process moves to operation 410, where structured content for the domain to learn about is accessed. According to an embodiment, the structured content is structured web pages. The structured content that is accessed is based on a type of information to learn. For example, movie web site(s) may be accessed for information relating to a movie domain, music web site(s) may be accessed for information relating to a music domain, sport web site(s) may be accessed for information relating to a sport domain, and the like.

Flowing to operation 420, the structured content is semantically parsed. The structured content follows one or more patterns (e.g. depending on the structured content accessed) According to an embodiment, a knowledge-graph (e.g. such as FREEBASE) may be accessed to obtain structured information. Generally, these web sites structure data relating to different topics/entities that each have a unique identifier. For example, FREEBASE currently comprises almost 23 million entities. The nodes of the knowledge graphs are entities (person, place, or thing). The edges of the graph are relations between the entities.

Transitioning to operation 430, search queries associated with the structured content is automatically mined. For example, the queries for the different relationships/tags may be determined. Typically, a large number of queries are obtained.

Moving to operation 440, the obtained search queries may be automatically filtered. Since there may be a large numbers of queries, one or more filters may be used to obtain a representative set of data to train and test the understanding models. These filters may be used to eliminate queries which cannot be parsed and which have an untagged non-stopword matching one of the entities in the web page. These are mostly queries with typos, such as "the hunger games by gary roos". According to an embodiment, these queries may be corrected (e.g. spelling correction). Queries are in query language that is somewhat different than natural language. A vast majority of the queries generally consist of keywords or phrases as expected. Different versions of this data may be used. For example, tagged queries may be used, tagged queries with a stopword which is not tagged to eliminate entity-only queries (like "avatar cameron") (NL-like) may be used, and queries which are also grammatical sentences (like "who directed avatar") (grammatical) may be used.

Flowing to operation 450, the resulting queries are automatically annotated using the tags in the associated web page. The annotation may occur in an unsupervised manner.

Transitioning to operation 460, the an understanding model is automatically created and tested. Some of the queries may be used to train the understanding model and other queries may be used to test the understanding model.

The process then flows to an end operation and returns to processing other actions.

Figure 5:
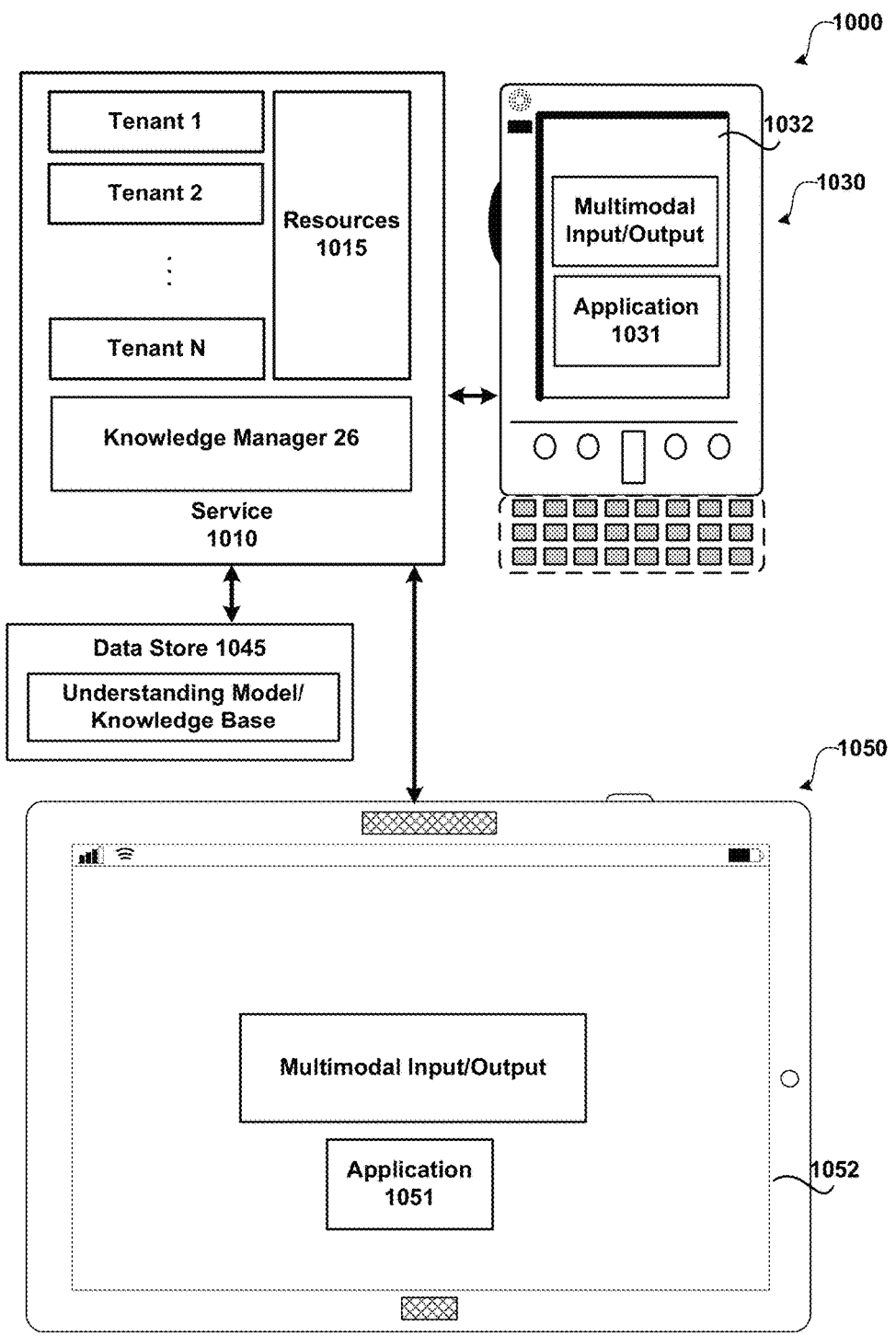
FIG. 5 illustrates an exemplary system for using the semantic web for unsupervised natural language semantic parsing.

FIG. 5 illustrates an exemplary system for using the semantic web for unsupervised natural language semantic parsing. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as multimodal services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

According to an embodiment, smart phone 1030 and touch screen input device/display 1050 are configured with multimodal applications and each include a an application (1031, 1051).

As illustrated, touch screen input device/display 1050 and smart phone 1030 shows exemplary displays 1052/1032 showing the use of an application using multimodal input/output. Data may be stored on a device (e.g. smart phone 1030, slate 1050 and/or at some other location (e.g. network data store 1045). Data store 1045 may be used to store the central knowledge base. The applications used by the devices may be client based applications, server based applications, cloud based applications and/or some combination.

Knowledge manager 26 is configured to perform operations relating to exploiting the semantic web for unsupervised natural language semantic parsing as described herein. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
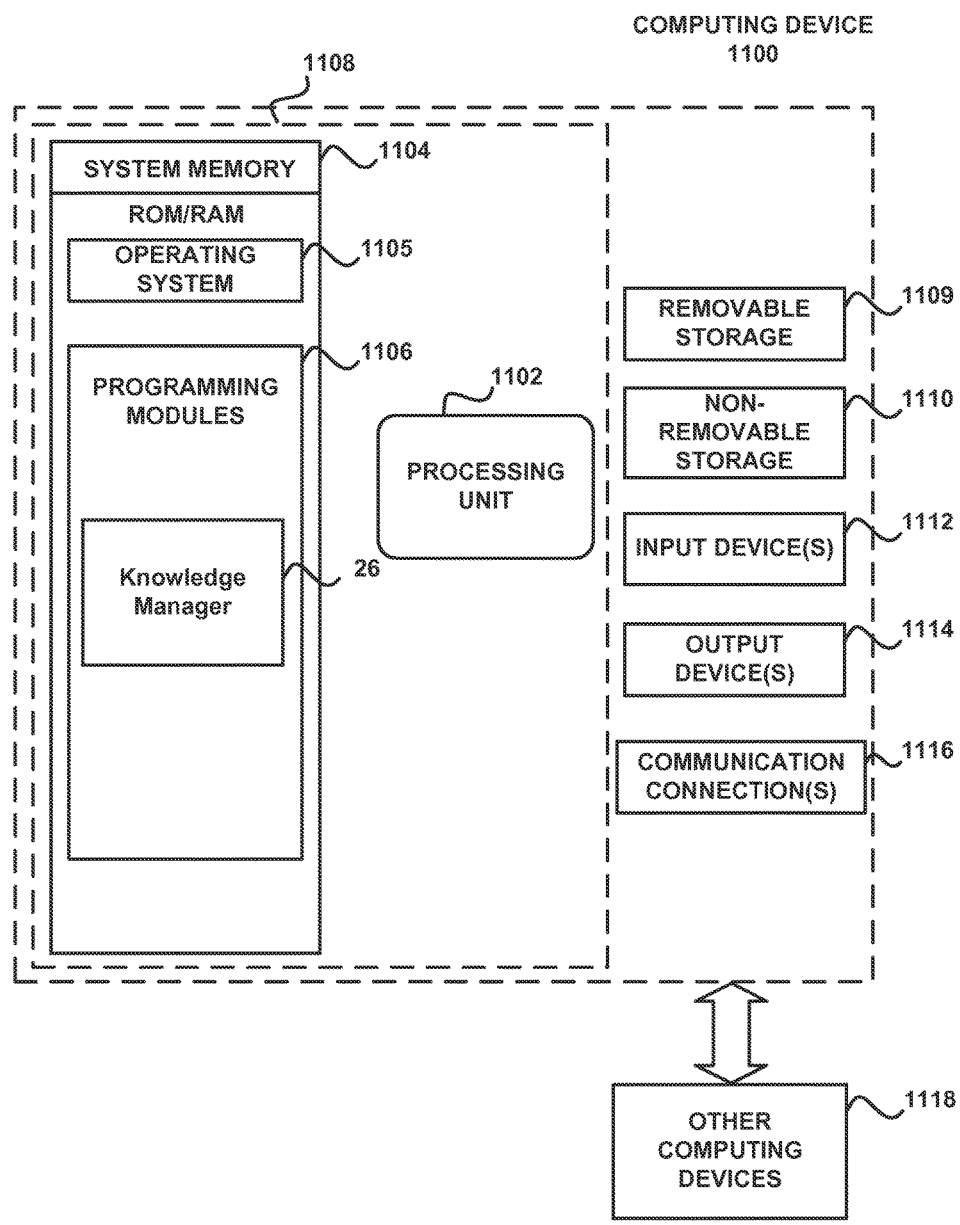
FIGS. 6, 7A, 7B, and 8 and the associated descriptions provide a discussion of a variety of operating environments in which embodiments of the invention may be practiced.
Figure 7A:
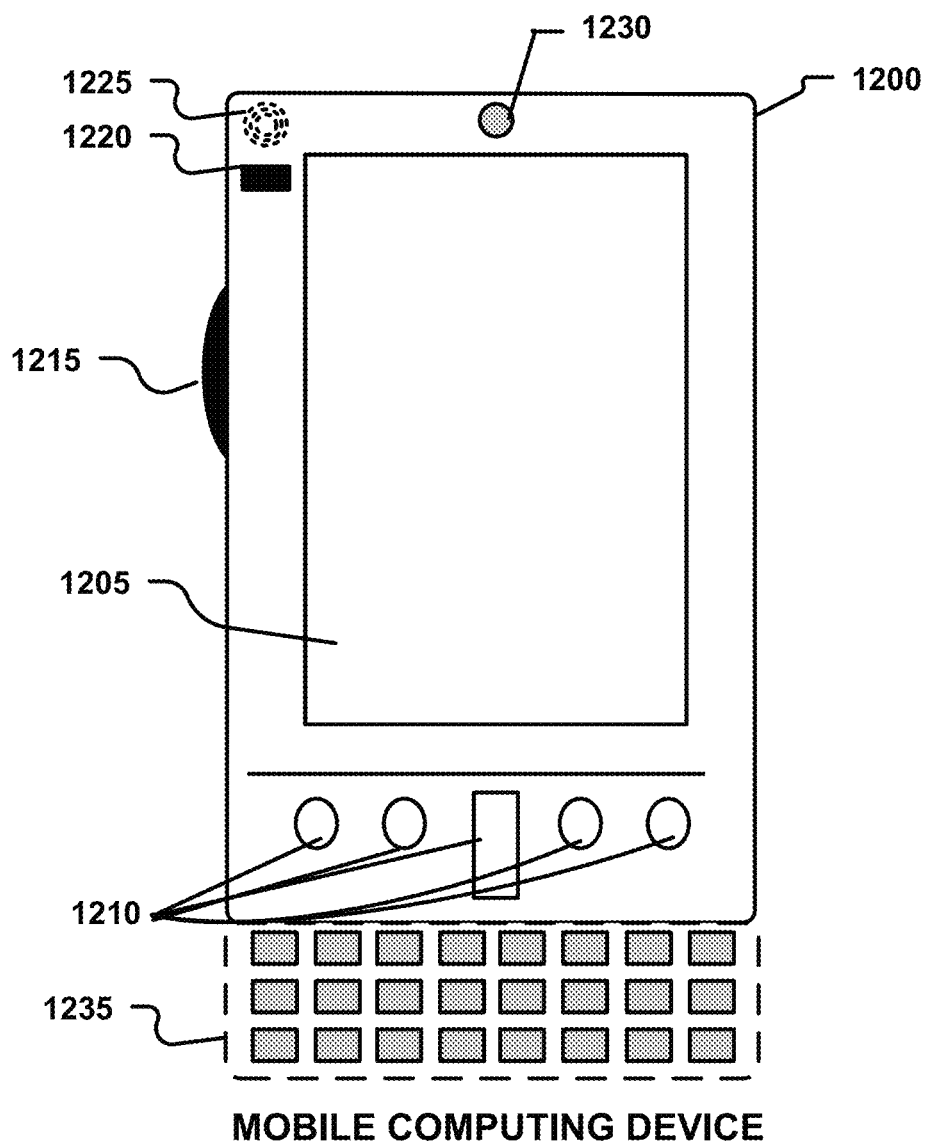
Figure 7B:
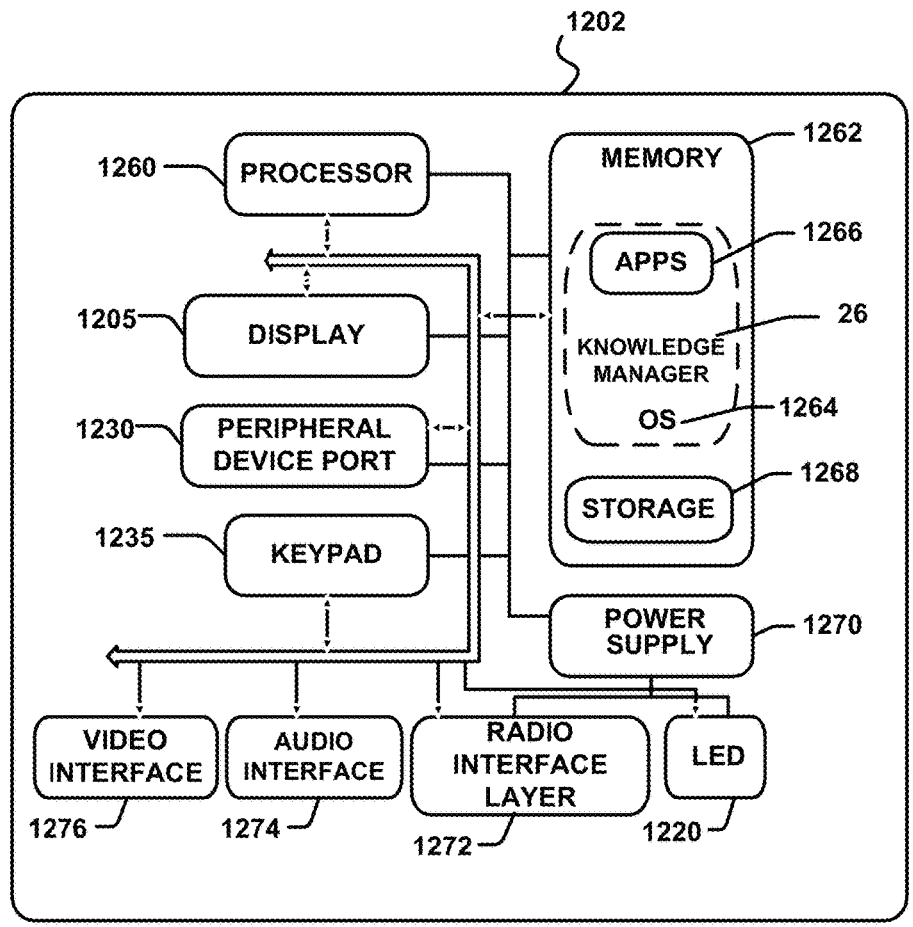
Figure 8:
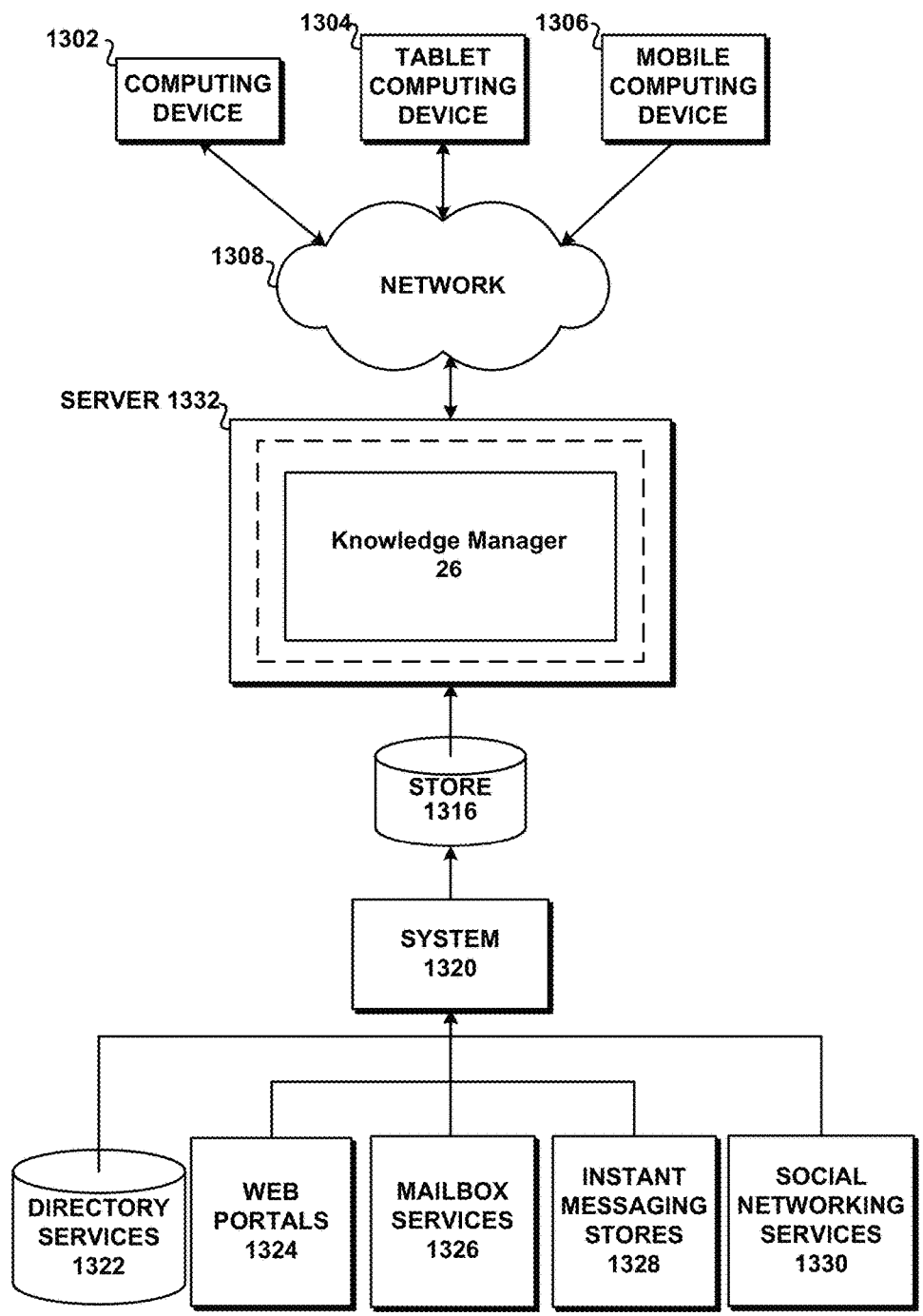

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a knowledge manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 6 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 7A and 7B illustrate a suitable mobile computing environment, for example, a mobile telephone, a smartphone, a tablet personal computer, a laptop computer, and the like, with which embodiments of the invention may be practiced. With reference to FIG. 7A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 7B is a block diagram illustrating components of a mobile computing device used in one embodiment, such as the computing device shown in FIG. 7A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the knowledge manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 7B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 8 illustrates an exemplary system architecture.

Components managed via the knowledge manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to using and determining variations. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for natural language semantic parsing, comprising:
   accessing structured content including structured web pages;
   parsing a semantic structure identified in the structured content to identify entities linked by a relationship, wherein each entity has a respective tag;
   mining a plurality of natural language search queries that can access the structured content to identify, from the plurality of natural language search queries, at least one natural language search query that includes at least one of the entities; and
   automatically annotating the at least one natural language search query using the respective tag.

2. The method of claim 1, further comprising building an unsupervised slot filling model using the at least one natural language search query annotated in the automatically annotating.

3. The method of claim 2, further comprising adapting the unsupervised slot filling model using in-domain unannotated sentences.

4. The method of claim 3, further comprising testing a performance of the model based on the at least one natural language search query.

5. The method of claim 1, wherein the structured content is defined by a triple that consists of two entities linked by a relation.

6. The method of claim 1, further comprising filtering the natural language search queries by removing at least a portion of the natural language search queries that have un-annotated stopwords.

7. The method of claim 1, wherein the respective tag of each entity is included in at least one of the structured web pages.

8. A computer-readable storage device storing computer-executable instructions that perform a method when executed, the method comprising:
   accessing structured content including structured web pages;
   parsing the structured content to identify two entities linked by a relationship, wherein each entity has a respective tag;
   mining a plurality of natural language search queries that can access the structured content to identify, from the plurality of natural language search queries, at least one natural language search query that includes at least one of the two entities;
   automatically annotating the at least one natural language search query to form at least one annotated natural language search query; and
   creating an understanding model including slots using the at least one natural language search query annotated in the automatically annotating.

9. The computer-readable storage device of claim 8, wherein the understanding model is created in an unsupervised manner.

10. The computer-readable storage device of claim 8, wherein the method further comprises testing a performance of the model based on the at least one natural language search query.

11. The computer-readable storage device of claim 8, wherein the structured content is defined by a triple that consists of two entities linked by a relation.

12. The computer-readable storage device of claim 8, further comprising filtering the natural language search queries by removing natural language search queries that have un-annotated non-stopwords.

13. A system for natural language semantic parsing, comprising:
   a processor and memory;
   an operating environment executing using the processor; and
   a knowledge manager that is configured to perform actions comprising:
      accessing structured content including structured web pages;
      parsing the structured content to identify two entities linked by a relationship,
   wherein each of the entities has a respective tag;
      mining a plurality of natural language search queries that can access the structured content to identify, from the plurality of natural language search queries, at least one natural language search query that includes at least one of the two entities;
      automatically annotating the at least one natural language search query using the respective tags; and
      creating an understanding model including slots using the at least one natural language search query annotated in the automatically annotating.

14. The system of claim 13, wherein the understanding model is created in an unsupervised manner.

15. The system of claim 13, further comprising testing a performance of the model based on the at least one natural language query.

16. The system of claim 13, wherein the structured content includes multiple triples that consist of two entities linked by a relation.

17. The system of claim 13, further comprising filtering the natural language search queries by removing some of the natural language search queries that have an un-annotated non-stopword.

18. The system of claim 13, wherein the structured web pages include a semantic web.

19. The system of claim 13, wherein the structured content is defined by a triple that consists of two entities linked by a relation.

* * * * *